(12) United States Patent
Matsuo

(10) Patent No.: US 8,312,068 B2
(45) Date of Patent: Nov. 13, 2012

(54) NODE DEVICE, INFORMATION COMMUNICATION SYSTEM, METHOD FOR MANAGING CONTENT DATA, AND COMPUTER READABLE MEDIUM

(75) Inventor: Hideki Matsuo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 322 days.

(21) Appl. No.: 12/732,589

(22) Filed: Mar. 26, 2010

(65) Prior Publication Data
US 2010/0250593 A1    Sep. 30, 2010

(30) Foreign Application Priority Data
Mar. 31, 2009    (JP) .................................. 2009-088131

(51) Int. Cl.
*G06F 7/00* (2006.01)
*G06F 17/30* (2006.01)

(52) U.S. Cl. .......................... 707/967; 707/948; 707/736
(58) Field of Classification Search .......................... None
See application file for complete search history.

(56) References Cited

U.S. PATENT DOCUMENTS

| 7,783,777 | B1 * | 8/2010 | Pabla et al. .................... 709/238 |
| 2007/0283043 | A1 | 12/2007 | Kiyohara et al. |
| 2009/0037445 | A1 | 2/2009 | Ushiyama |
| 2009/0313046 | A1 * | 12/2009 | Badgett et al. .................... 705/3 |

FOREIGN PATENT DOCUMENTS
JP    2007-280303 A    10/2007
* cited by examiner

*Primary Examiner* — Uyen T. Le
(74) *Attorney, Agent, or Firm* — Baker Botts L.L.P.

(57) ABSTRACT

A node device communicates with a plurality of node devices via a network. The node device includes a first obtaining unit that obtains search information for searching the content data stored in at least one node device, and a particular determination unit that applies a predetermined rule to determine whether the search information is required to be stored. A first storage unit stores the search information when required. A second obtaining unit obtains the content data from the information communication system, and a second storage unit stores the content data from the second obtaining unit. A third storage unit stores the search information corresponding to the stored content data in the second storage unit. A management unit manages the stored content in the second storage unit based on the search information stored in at least one of the first storage unit and the third storage unit.

18 Claims, 7 Drawing Sheets

NODE DEVICE, INFORMATION COMMUNICATION SYSTEM, METHOD FOR MANAGING CONTENT DATA, AND COMPUTER READABLE MEDIUM

CROSS REFERENCE TO RELATED APPLICATION

This application claims priority from Japanese Patent Application No. 2009-088131 filed on Mar. 31, 2009, the entire contents of which are incorporated herein by reference.

BACKGROUND OF THE INVENTION

1. Field of the Invention

The present invention relates to an information communication system of Peer to Peer type. The Peer to Peer type system comprises a plurality of node devices which are capable of communicating each other via a network. In particular, the invention relates to an information communication system in which the node devices store a plurality of content data in a distributed manner.

2. Description of Related Art

Generally, the above-mentioned system comprises a plurality of node devices, which store plurality of content data in the distributed manner. It has been proposed that each node device in the system which obtains from the other node devices and stores content catalogue information. The Content catalogue information includes attribute information of each content data. The content catalogue information is utilized to search desired content data. The attribute information, for example, includes a title of content data, a content category, or a name of an artist of content data. Each node device obtains the content catalogue information. And each node device is capable of obtaining desired content data, based on the attribute information in the content catalogue information. The content catalogue information is shared with the plurality of node devices.

SUMMARY OF THE INVENTION

Each node device may stores the content catalogue information distributed to each node device based on a predetermined rule. Each node device may search the distributed catalogue information among the node devices in the system. That is, each node device executes searching by making use of content catalogue information, which is shared among node devices.

In an embodiment of the invention, a node device is configured to communicate with a plurality of node devices, wherein content data is stored in at least one node device and the content data is accessible from the plurality of node devices, wherein the node devices are connected via a network as part of an information communication system. The node device comprises a first obtaining unit configured to obtain search information for searching the content data stored in the node device, a particular determination unit configured to apply a predetermined rule to determine whether the search information obtained by the first obtaining unit is required to be stored in the node device, a first storage unit configured to store the search information when the particular determination unit determines that the search information is required to be stored, a second obtaining unit configured to obtain the content data from the information communication system, a second storage unit configured to store the content data obtained by the second obtaining unit, a third storage unit configured to store the search information corresponding to the content data stored in the second storage unit, and a management unit configured to manage the content data stored in the second storage unit, based on the search information stored in at least one of the first storage unit and the third storage unit.

In another embodiment of the invention, a computer program product comprises a computer readable medium having computer readable instructions stored thereon, the computer readable instructions configured to be executed as a computer program for causing a computer to function as a node device that communicates with a plurality of node devices connected via a network as part of an information communication system. The computer functioning as the node device comprises a first obtaining unit configured to obtain search information for searching the content data stored in the node device, a particular determination unit configured to apply a predetermined rule to determine whether the search information obtained by the first obtaining unit is required to be stored in the node device, a first storage unit configured to store the search information when the particular determination unit determines that the search information is required to be stored, a second obtaining unit configured to obtain the content data from the information communication system, a second storage unit configured to store the content data obtained by the second obtaining unit, a third storage unit configured to store the search information corresponding to the content data stored in the second storage unit, and a management unit configured to manage the content data stored in the second storage unit, based on the search information stored in at least one of the first storage unit and the third storage unit.

In yet another embodiment of the invention, a computer program product comprises a computer readable medium having computer readable instructions stored thereon, the computer readable instructions configured to be executed by the computer equipped in at least one node device of a plurality of node devices connected via a network in an information communication system in which content data is stored in at least one node device and is accessible from the other of the plurality of node devices. The computer program causes the computer to perform steps comprising a first obtaining step of obtaining search information for searching content data stored in at least one node device, a particular determining step of applying a predetermined rule to determine whether the obtained search information is required to be stored in the node device, a first storing step of storing the search information, when the particular determining step determines that the search information is required to be stored, a second obtaining step of obtaining the content data from the information communication system, a second storing step of storing the content data obtained by the second obtaining step, a third storing step of storing the search information according to the content data stored in the second storing step, a managing step of managing the content data stored in the second storing step, based on the search information stored by at least one of the first storing stem and the third storing step.

In still yet another embodiment of the invention, a method for managing a content data in an information communication system in which a plurality of node devices are connected via a network and communicate with each other, content data being stored in at least one node device and being accessible from the other node devices, the method comprises a first obtaining step of obtaining search information for searching content data stored in at least one node device, a particular determining step of applying a predetermined rule to determine whether the obtained search information is required to be stored in the node device, a first storing step of storing the search information, when the particular determining step determines that the search information is required to be stored, a second obtaining step of obtaining the content data from the information communication system, a second storing step of storing the content data obtained by the second obtaining step, a third storing step of storing the search information according to the content data stored in the second storing step, a managing step of managing the content data stored in the second storing step, based on the search information stored by at least one of the first storing stem and the third storing step.

DETAILED DESCRIPTION OF EMBODIMENTS OF THE INVENTION

Hereinafter, exemplary embodiments of the present invention will be described with reference to the drawings. In the exemplary embodiments, a case in which the present invention is applied to a content distribution storage system is described.

1. Configuration and Operation of Content Distribution Storage System

At first, the configuration and operation of a content distribution storage system will be described with reference to FIG. 1.

Figure 1:
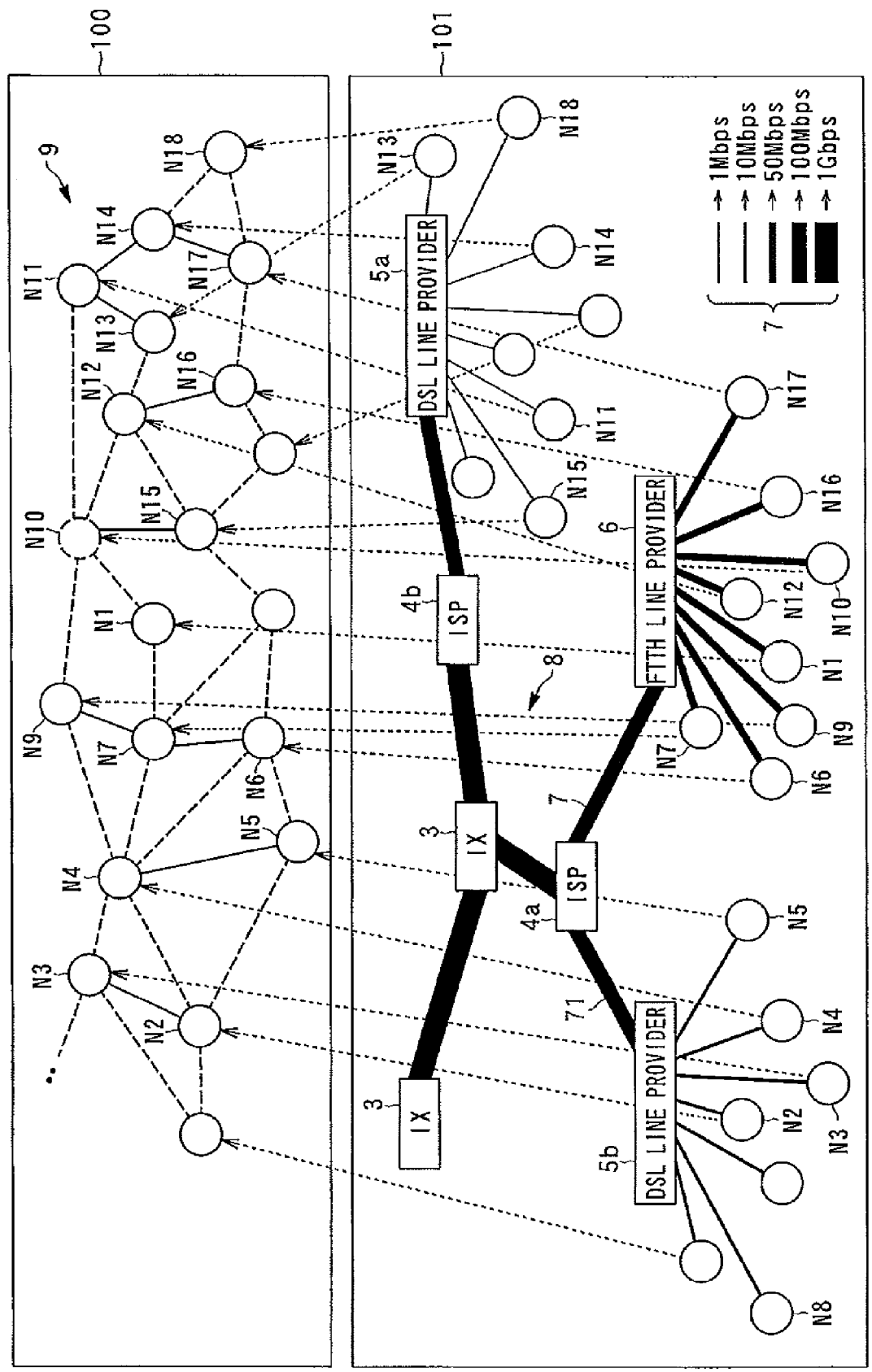
FIG. 1 shows an example of a configuration that a plurality of node devices are connected in the content distribution storage system according to the first exemplary embodiment.

FIG. 1 shows an example of the configuration that a plurality of node devices are connected in the content distribution storage system.

In a concrete configuration 101 shown in FIG. 1, a network 8 such as the Internet includes an internet exchange (IX) 3, internet service providers (ISPs) 4a and 4b, devices 5a and 5b of digital-subscriber-line providers (DSL), a device 6 of a fiber-to-the home provider (FTTH), and a communication line 7, e.g., a telephone line, an optical cable, and the like. Although not shown, routers for transferring data or packets are connected in the network 8 of the example shown in FIG. 1 as necessary.

A plurality of node devices Nn (n=1, 2, 3, . . . ) are connected to the network 8. The node device is also referred to as "node." Each of the nodes Nn is assigned a unique manufacturing number and an IP (Internet Protocol) address.

In conceptual configuration 100 shown in FIG. 1, a content distribution storage system S of this exemplary embodiment is a peer-to-peer network system. The peer-to-peer network system is made by connecting any nodes of the plurality of nodes Nn.

A network 8 provided in the conceptual configuration 100 shown in FIG. 1 is an overlay network configuring a virtual link made by a use of an existing network 8. That is, the overlay network 9 is a logical network. The overlay network 9 is implemented by a specific algorithm, for example, an algorithm utilizing a distributed hash table (hereinafter referred to as DHT). Each of the nodes Nn participating in the overlay network 9, i.e., the content distribution storage system S, is assigned a node ID as identification information containing a given number, e.g., predetermined number of digits. The identification information may be unique to each node Nn. In this exemplary embodiment, a connection of a node Nn to the peer-to-peer network is referred to as "a participation in the peer-to-peer network." The node ID is one of the examples of node identification information.

For example, the node ID is a hash value obtained by hashing a unique number assigned to each node Nn such as an IP address or a manufacturing number by a common Hash function. The Hash function is an SHA-1, or the like. The hashed value has a bit length of 160 bits. The node IDs are uniformly distributed in a single ID space.

Each node Nn holds a routing table using the DHT. The routing table specifies destinations of respective messages in the content distribution storage system S. Specifically, a node Nn which is appropriately spaced in the ID space is determined. Pluralities of sets of node information are registered in the routing table. Each of the sets of node information includes a node ID, an IP address, and a port number of the determined node Nn.

An example of the routing table using such the DHT is described, for example, in US Patent Application Publication No. 2007/0283043 A1, the entire contents of which are incorporated herein by reference.

As described in US Patent Application Publication No. 2007/0283043 A1, the content distribution storage system S stores replicas in a plurality of nodes Nn in a distributed manner. The replicas are sets of data corresponding to replication of various contents of different substances, e.g., a movie, music, and the like. The replicas are stored in a given file format. A single replica may be divided and stored in the plurality of nodes Nn. A replica of content is hereinafter referred to as a "replica" or "content data".

Each of the replicas is available among the plurality of nodes Nn. For example, a node N5 stores a replica of content about a movie having a title XXX, whilst a node N3 stores a replica of content about a movie having a title YYY. As described above, the replicas are stored in the plurality of nodes Nn in a distributed manner. A node Nn storing a replica is hereinafter referred to as a "content-holding node."

Information, such as a content name (title) and a content ID (unique identification information) for each content, is added to each of the replica of the content. The content ID may be unique to each of the replica. The content ID is one of the examples of content identification information. The content ID is generated, for example, by hashing a content name and an arbitrary numeral by a Hash function. The Hash function used herein is the Hash function common to the Hash function for obtaining the node ID. The generated content ID is arranged in the same ID space where the node ID belongs. An arbitrary numeral is, for example, several first bytes of content data. Alternatively, a system manager may give a unique ID value to each content. The content ID to be given has the same bit length as that of the node ID. An example of the ID space is described, for example, in US Patent Application Publication No. 2009/037445 A1, the entire contents of which are incorporated herein by reference.

Locations of the replicas of the contents stored in the distributed manner are stored and managed by one or more nodes Nn. In the exemplary embodiment, information including a combination of node information about a node Nn storing the replica of the content and the content ID of the corresponding content, or the like is included in index information. A node Nn that manages the location of the replica of the content is referred to as a "root node" or a "root node of content or content ID." The index information is stored in and managed by the root node. The index information is stored in an index cache.

In this embodiment, content catalogue information is delivered to all of the nodes Nn. The content catalogue information is information including a correspondence between a content name and the content ID. When a user requires obtaining content data, first, the user obtains content ID. The node device which is required to obtain content data by the user is hereinafter referred to as a "user node." The user node obtains the content ID by referring the content catalogue information.

The content catalogue information is transferred using multi-cast transfer technology. by a management server. The management server manages the content distribution storage system S.

The user node generates a search message (query) which includes the obtained content ID. The search message is indicative of searching the content-holding node whose content ID is included in the search message. The user node sends the generated query to the root node based on a routing table. The user node has the root node send address information of the content-holding node to the user node. The user node has access to the content-holding node based on the address information. The user node sends a content transfer request message to the content-holding node, and the content-holding node sends the content data to the user node. The user node also may send the content transfer request message to the content-holding node, and may download the content data from content-holding node. An example of the routing table using such DHT and a method of transferring a message among the node devices are described, for example, in US Patent Application Publication No. 2009/037445 A1, the entire contents of which are incorporated herein by reference.

The catalogue information includes a record. The record is one example of search information of content.

The record is attribute information of the content data. For example, the attribute information is such as the content ID, publication time information, a keyword, evaluated value, a title of the content, a category, an artist, a performer, a name of a director. The publication time information means a period of publishing the content data in the network. The keyword is indicative of an index of searching for content data. An example of the attribute information is described, for example, in US Patent Application Publication No. 2009/037445 A1, the entire contents of which are incorporated herein by reference.

The user decides the content data which the user requires using these records. These records are also used as the keywords for searching, when the user selects the required content data among a lot of content data. For example, if the user inputs "JAZZ" as a search keyword, the content distribution storage system S searches the content data corresponding to "JAZZ". And the search result is displayed for the user in a display device of the user node. As a result, the user can select content data in the search result. For example, the search result is indicative of displaying the searched record of content data.

When the catalogue information is delivered to each node, the node stores all delivered catalogue information in its own internal memory. In an embodiment of the invention, the more the content data is inputted in the content distribution storage system S, the more content catalogue information is delivered to the nodes. Thus, there may be so much delivered content catalogue information that the node may not store the delivered catalogue information in its own internal memory.

In an embodiment, the catalogue information is stored among a plurality of nodes in the distributed manner. Specifically, a range of storing the content catalogue information in each node is determined based on a predetermined rule. In an embodiment of the invention, each node stores the predetermined content catalogue information. For example, each node may store the limited number of content catalogue information predetermined according to the operational capability of each node. In this embodiment, the predetermined rule is a rule of using "Range". The method of using "Range" is explained as follows.

"Range" may be a predetermined value in each node Nn. For example, "Range" may represent the number of digit bits by which the node ID and the content ID correspond to each other, starting from the highest order digit bit. If "Range" equals to "1", it means at least the highest order bit of node ID corresponds with that of content ID. If "Range" equals to "2", it means at least the highest order bit and the second highest order bit of node ID correspond with those of content ID. The wider the range of storing content catalogue information is, the larger the "Range" number may be. Each node may store the "Range" described above in its own internal memory. When the node acquires the record, each node compares the content ID corresponding to the acquired record with the node ID of the node itself. If a figure of the content ID in the value of "Range" has a highest rank digit corresponding with the node ID of the node itself in the value of "Range" highest rank digit, the node stores the record corresponding to the content ID in the internal memory as a range of storing. For example, when the node ID is "0132" and "Range" is "1", the node of the node ID "0132" stores at least the record of the content ID the highest digit of which is "0" as a range of storing.

In another example, when the node ID is 1001" and the value of "Range" is "2," the node of the node ID "1001" stores at least the record of the content ID, the highest 2 digits of which are "10" as a range of storing. If the value of "Range" is "0," then the node having been assigned a "Range=0" stores all records.

The node does not prevent from storing the catalogue information which is not satisfied with the range of storing. In an embodiment, the node may store at least the assigned range of storing the content catalogue information. Detailed process of receiving the catalogue information, are described, for example, in US Patent Application Publication No. 2009/037445 A1.

The value of "Range" may be dependent on each node. Each node may set a value of the "Range." For example, in the node, the larger the first storage area which stores the range of storing content catalogue information is, the bigger the value of "Range" is. If the number of digit of the content ID and the number of digit of the node ID are equal to the value of "Range," it may be determined if the content ID corresponds to the node ID. In this embodiment, the range of storing may be determined by any device of a management server, the node Nn itself and another node Nn among the records or the content IDs. As described above, each node which participates in the overlay-network 9 may store the content catalogue information of the predetermined range of storing. Detailed process of receiving the catalogue information is described, for example, in US Patent Application Publication No. 2009/037445 A1, the entire contents of which are incorporated herein by reference.

In an embodiment, each node stores the content catalogue information which is corresponding to the record of storing in its own internal memory. Each node may refer to the stored content catalogue information, when checking a state of storing content data in the internal memory during the "process of checking the stored content data," which is described in more detail herein. When the content catalogue information corresponding with the record which stores in the internal memory is not stored, the node retrieves the content catalogue information which is not stored in the internal memory. The node may acquire the retrieved content catalogue information from another node, e.g., through Internet.

For example, the checking state of storing may correspond to the node which finishes publication of the content data whose publication period has passed through Internet, based on publication period information of the content data. Specifically, the node may delete the content data whose publication period has passed from the internal memory. The deleting process makes the publication of content data finished.

For example, a confirming process of the stored content data is a process of permission to transmit the content data which is during publication period, based on the publication period information. Specifically, when the node receives a request of transmitting the stored content data from the other node device, the node device confirms the record corresponding to the requested content data. If the requested content data is during publication period, the node permits to transmit the requested content data.

Each node may have a function for storing local catalogue information of the range of storing and storing content catalogue information corresponding to the stored content data in the internal memory. The internal memory may have a storage area of the local catalogue information and a storage area of the corresponding content catalogue information. The storage area of the local catalogue information stores the local catalogue information which is acquired as the range of storing from another node Nn or a management Server. The storage area of the corresponding content catalogue information stores the content catalogue information corresponding to content data stored in the internal memory.

The corresponding content catalogue information may be acquired from another node Nn or a management server regardless of the range of storing. The node can refer to the local catalogue information and the corresponding content catalogue information without acquiring the catalogue information through Internet, when the node confirms or checks the stored content data. If the node can not retrieve the required catalogue information among the local catalogue information and the corresponding content catalogue information, the node performs "content retrieving process" as described below and transmits a content retrieving message to other node devices through Internet. This function may decrease network burden which arises when the content catalogue information is acquired through Internet.

2. Node Nn

The configuration and function of the node Nn is now described with reference to FIG. 2.

Figure 2:
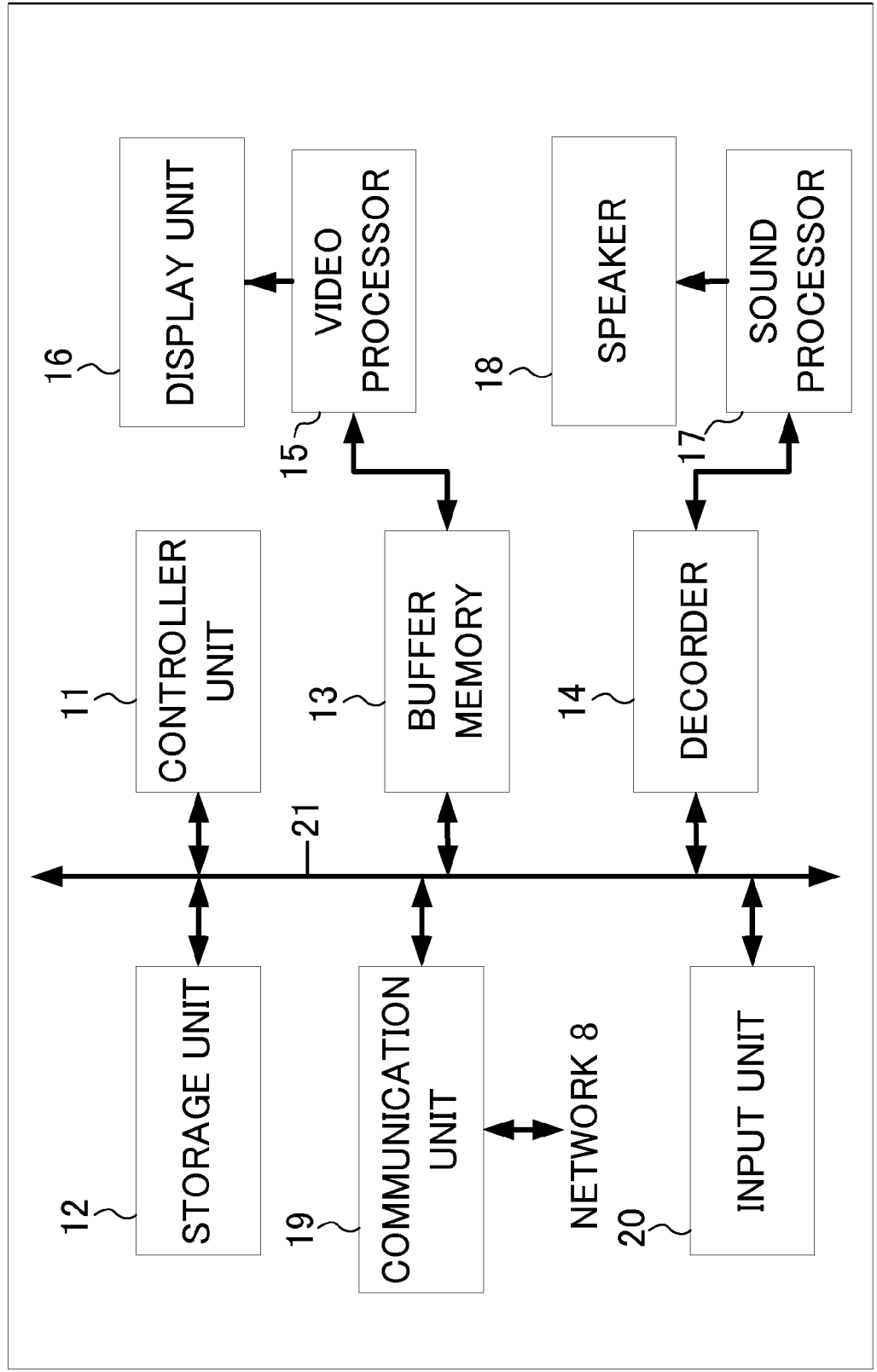
FIG. 2 is a block diagram showing a general exemplified configuration of a node device Nn.

FIG. 2 is a view showing an exemplified general configuration of the node Nn.

As shown in FIG. 2, each of the nodes Nn includes a controller unit 11, a storage unit 12, a buffer memory 13, a decoder unit 14, a video processing unit 15, a display unit 16, an audio processing unit 17, a speaker 18, a communication unit 19, and an input unit 20. The control unit 11, the storage unit 12, the buffer memory 13, the decoder unit 14, the communication unit 19, and the input unit 20 are connected with one another via the bus 21. The control unit 11 is a computer including a CPU having an operational function, working RAM, ROM storing various sets of data and programs, and the like. The storage unit 12 includes a hard disk drive (HD), and the like, for storing various sets of data and programs. The storage unit 12 stores: the replicas of contents; the routing table using the DHT; the index information; and the content catalogue information. The buffer memory 13 temporarily stores the replicas of received contents, and the like.

The decoder unit 14 decodes encoded video and audio data, and the like, included in the replica of the content. The term "decoding" means expansion and decryption of data, and the like. When the content data includes a movie or an audio, the decoder unit 14 decodes the video data or the audio data which is included in the content data. The video processing unit 15 processes the decoded video data, and the like, by a predetermined image processing and outputs the result as a video signal. The display unit 16 is a CRT, a liquid-crystal display, and the like, which displays a video in accordance with a video signal output from the video processing unit 15.

The audio processing unit 17 converts the decoded audio data into an analogue audio signal through digital to analogue (D/A) conversion, amplifies the signal by use of an amplifier, and outputs the amplified audio signal. The speaker 18 outputs, as sound waves, an audio signal output from the audio processing unit 17. The communication unit 19 controls communication of data with another node Nn, and the like, via the network 8. The input unit 20 receives a command from the user and gives a command signal to the control unit 11 in accordance with the command. The input unit 20 is, for example, a keyboard and mouse or a remote controller and operation panel, and the like. A personal computer, a Set Top Box (STB), a TV receiver, and the like, are applicable for the node Nn. The node Nn is disposed, for example, in a user's home, a Karaoke bar, a hotel, and the like.

The storage unit 12 has a cache area of storing content data. The cache area stores the acquired content data which is acquired from any of node devices, participating in the content distribution storage system S, or a management Server.

The storage unit 12 stores a cache list. The cache list includes a content name or the content ID which is stored in the cache area of the internal memory of each node. The content name or content ID corresponding to the content data is stored in the cache area. The cache area also stores check time indicative of the time when the record of content data is checked. The record of content data is checked when "process of checking stored content data" or transmitting process based on a request of transmitting the stored content data in the internal memory is executed.

The storage unit 12 also stores the IP address and node ID of the node device itself The storage unit 12 also stores the "Range" as described above.

The storage unit 12 has a local catalogue information storage area and a stored content catalogue information storage area. The local catalogue information storage area stores the local catalogue information. The stored content catalogue information storage area stores the stored content catalogue information.

In the controller unit 11, the CPU reads a program, including a node processing program, stored in the storage unit 12, and the like, and executes the read program. As a result of execution of the program, an operation of the node is controlled in a centralized manner, whereby the control unit 11 performs processing of at least any one of the user node, a relay node, the root node, the cache node, and the content-holding node.

The node processing program may also be downloaded from a predetermined server located, for example, in the network 8. For example, the node processing program may also be recorded in a recording medium, such as a CD-ROM, and read via a driver for the recording medium.

3. Process of Node Nn

A process of node Nn is explained in detail using figures as follows.

3-1 Main Process of Node Nn

Figure 3:
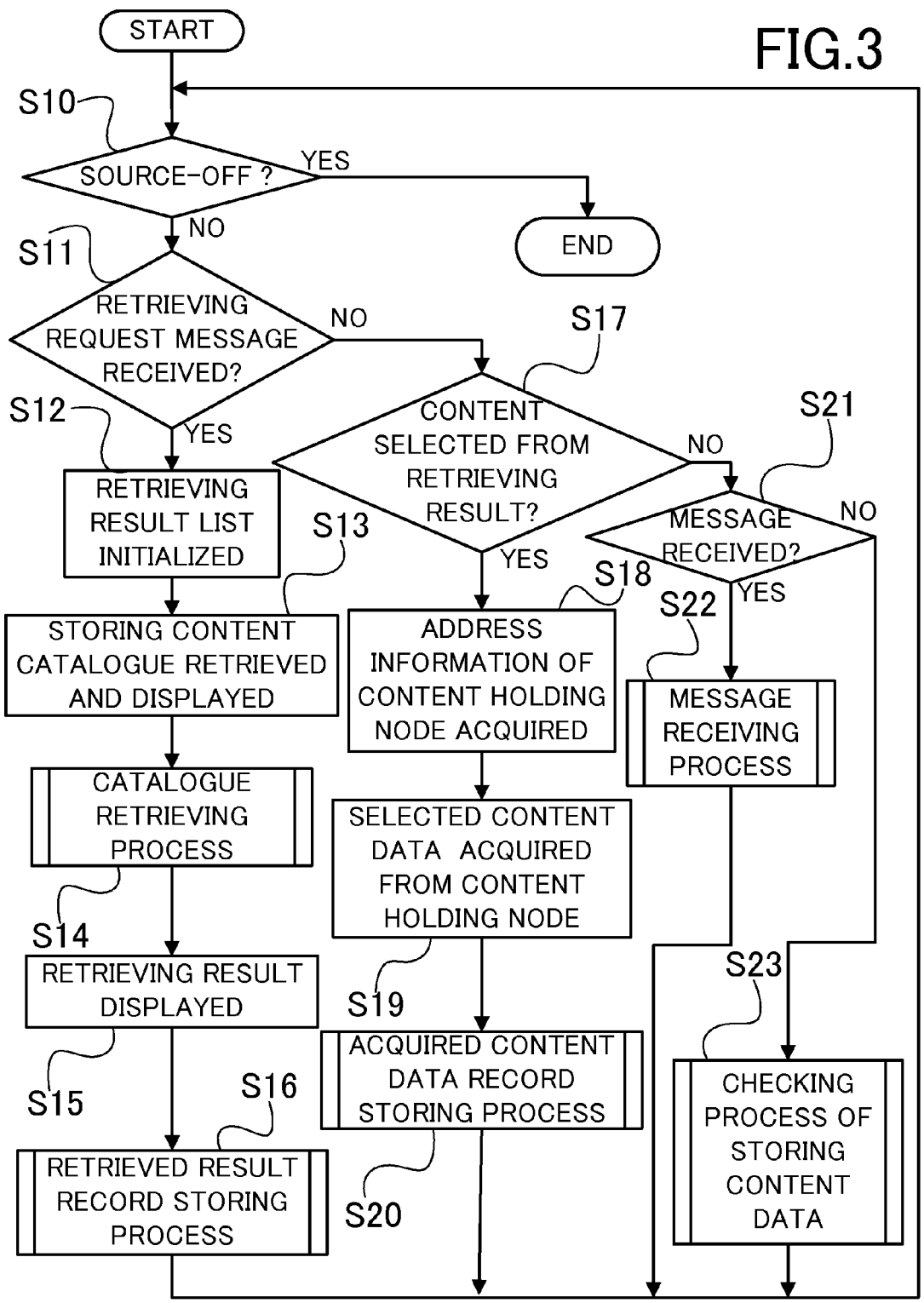
FIG. 3 is a flowchart showing exemplary processing of the control 11 in the node Nn.

FIG. 3 illustrates a process flow chart of a main process of node Nn which participates in the content distribution storage system S. The main process is started after the node participated in the content distribution storage system S and read a node process program.

First, the controller unit 11 determines if an electric source of the node itself is OFF or not (Step S10). If the electric source is OFF (Step S10: Yes), the main process is finished. If the electric source is not OFF (Step S10: No), the controller unit 11 determines if the controller unit 11 receives a retrieving request of content, based on the predetermined rule (Step: S11). Concretely, for example, the controller unit 11 determines if the controller unit 11 receives the retrieving request of content which is inputted by the input device 20. A user of node operates the input device 20 and the user inputs a retrieving condition such as a key word or a publication period by the input device 20.

As a result of determination, the controller unit 11 receives the retrieving request (Step S11: Yes), the controller unit 11 initializes the storage area of "list of retrieved result" in RAM. The storage are of "list of retrieved result" is pre-set.

Next, the controller unit 11 retrieves the requested content in the stored content catalogue information. If the controller unit 11 can retrieve the requested content which meets the predetermined rule, the controller unit 11 instructs the display 16 to show a retrieved result (Step S13). The retrieved result of content is such as the record corresponding to the requested content. Then, the controller unit 11 stores the record in the storage area of the storage unit 12 as a retrieved result.

Then, the controller unit 11 performs "Catalogue retrieving process" (Step S14). "Catalogue retrieving process" includes two steps. In a first step, the controller unit 11 transmits a retrieving request message, which includes a retrieving condition of the requested content, to another node Nn. Another node Nn receives the retrieving request message and retrieves in the local catalogue information, or the corresponding content catalogue information, based on the received retrieving request message. Another node Nn transmits the retrieved result of the received retrieving request message. In a second step, the node Nn which transmits the retrieving request message, receives the retrieving result. Detailed process of "Catalogue retrieving process", is described, for example, in US Patent Application Publication No. 2009/037445 A1, the entire contents of which are incorporated herein by reference.

In "Catalogue retrieving process" of the Step 14, the controller unit 11 retrieves in the local catalogue information in the internal memory.

The controller unit 11 instructs the display 16 to show the retrieved result which is acquired from another node Nn (Step S15). The controller unit 11 also instructs the display 16 to show the retrieved result of the local catalogue information in the internal memory (Step S15).

The retrieved result acquired in the Step S13 is registered in a list of the retrieved result. In Step the S15, the retrieved result not registered in the list may be shown in the display 16 in order to prevent from showing the same retrieved result as that shown in Step S13.

Then, the controller unit 11 performs a "retrieved result record storing process" (Step S16). After performing the Step S16, the Step S10 is performed, the "retrieved result record storing process" is described as below in detail.

In Step S11, the controller unit 11 determines that the controller unit 11 does not receive the retrieving request (Step S11: No), the controller unit 11 determines if at least one content is selected from the retrieved result which is shown in the display 16 in the Step S13 or Step S15 (Step S17).

Concretely, the controller unit 11 determines if at least one content is selected from the retrieved result in the display 16 by the input device 20 which is operated by the user.

As a result of determination, the controller unit 11 acquires the address information of the content holding node storing the selected content, when the controller unit 11 determines at least one content which is selected in step S17 (Step S17: Yes). Concretely, the controller unit 11 transmits the query to the root node storing the selected content, based on the content ID of the selected content. The root node storing the selected content receives the query and transmits the address information of the content holding node storing the selected content. Then, the controller unit 11 receives the address information of the content holding node of the selected content. After a predetermined time has passed, if the controller unit 11 can not acquire the address information of content holding node, the controller unit 11 inquires the address information to the management server. The controller unit 11 may acquire the address information of the selected content from management server.

Then, the controller unit 11 accesses the content holding node according to the acquired address information in the Step S18, and acquires the selected content data from content holding node (Step S19). The controller unit 11 stores the acquired content data in the cache area of the storage unit 12. And the controller unit 11 stores relevant information of the acquired content data in the cache area. The controller unit 11 performs a registering process of content data, called "publish", in order to send to another node a message indicative of storing the content data. Detailed process of a "registering process of content data", are described, for example, in US Patent Application Publication No. 2009/037445 A1, the entire contents of which are incorporated herein by reference. The controller unit 11 performs the reproduction process of the acquired content data. The controller unit 11 performs the reproduction process and the "acquired content data record storing process" in parallel.

Then, the controller unit 11 performs the "acquired content data record storing process" (Step S20). The controller unit 11 stores the record of the acquired content data in the step S19 in the corresponding content catalogue information or the local content catalogue information. And the controller unit 11 performs the Step S10. The "acquired content data record storing process" is explained below in detail.

If the controller unit 11 determines at least one content is not selected in the Step S17 (Step S17: No), the controller unit 11 determines if the controller unit 11 receives the message from another node Nn or the management server (Step S21).

As a result of determination, the controller unit 11 determines the controller unit 11 receives the message (Step S21: Yes), the controller unit 11 performs a "message receiving process" (Step S22), and next performs step S10. A detail of the "message receiving process" is explained below.

The controller unit 11 determines that the controller unit 11 does not receives the message (Step S21:No). The controller unit 11 performs a "check process of stored content data" (Step S23), and next performs Step S10. The "check process of storing content data" in Step S23 is explained below.

In Step S18, the controller unit 11 acquires the address information of the content holding node storing the required content data from the root node. The root node may transmit a content transmit request message indicative of the address information of the user node to the content holding node. In this case, the content holding node receives the content transmit request message. The content holding node transmits the requested content data to the user node. The user node may receive the requested content data described above.

In this embodiment, the controller unit 11 performs the "acquired content data record storing process", after the controller unit 11 acquires the content data in the Step S19. The controller unit 11 may perform the "acquired content data record storing process" in the Step S17, when at least one content is selected. After performing the "acquired content data record storing process", the controller unit 11 may acquire the content data.

The controller unit 11 may not perform the "acquired content data record storing process" in the Step S20, when the user cancels the acquired content data in the Step S19 using the input device 20.

3-2. "Retrieved Result Record Storing Process" and "Acquired Content Data Record Storing Process"

Figure 4:
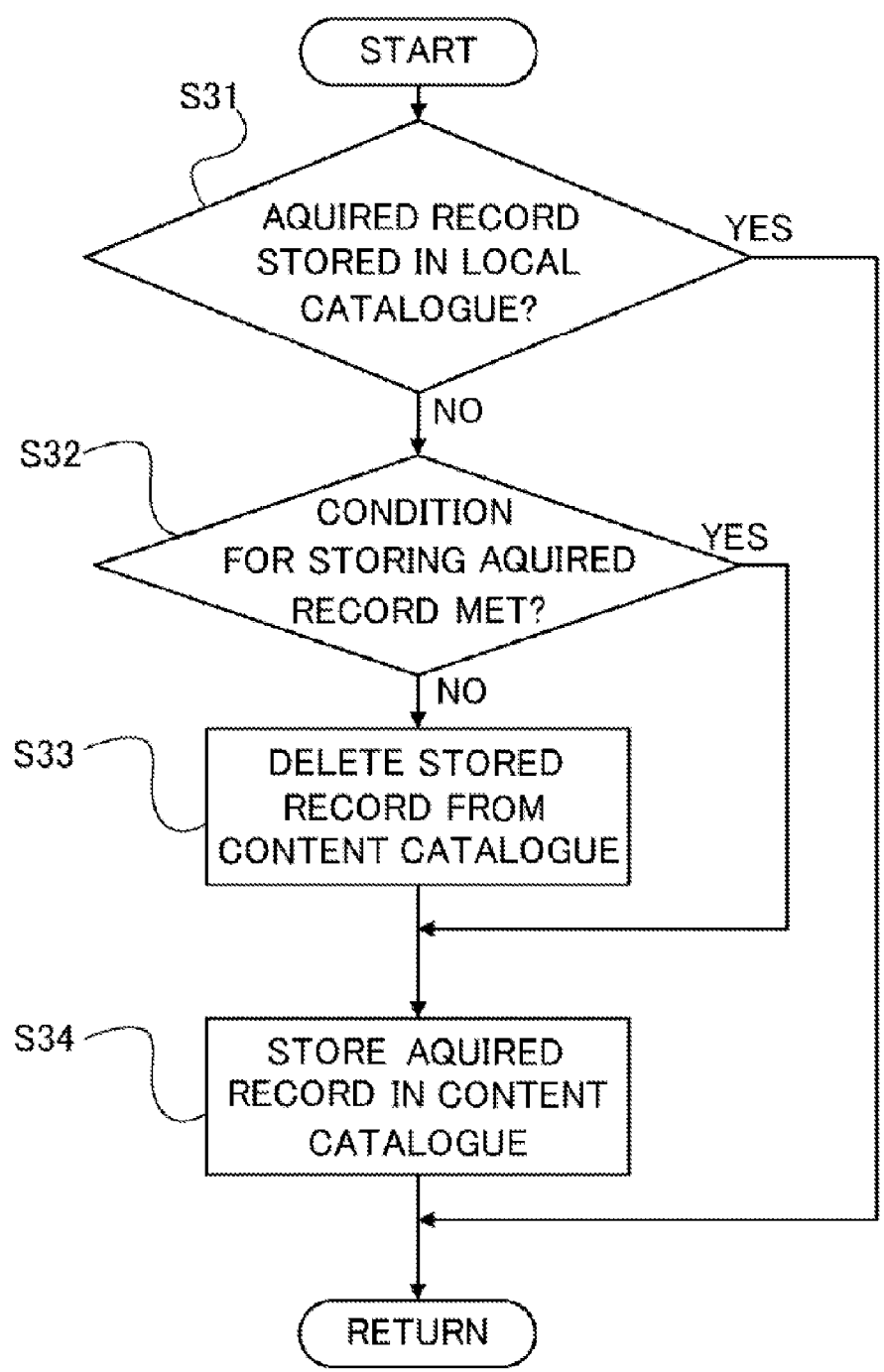
FIG. 4 shows a flow chart of "Retrieved result record storing process" in step S16 and "Acquired content data record storing process" in step S20.

FIG. 4 illustrates a process flow chart of a "Retrieved result record storing process" as shown in Step S16 and an "Acquired content data record storing process" as shown in Step S 20.

The "Retrieved result record storing process" shown in Step S16 is a process of storing the record which is registered in the list of the retrieved result in the stored content catalogue information. The "Acquired content data record storing process" in Step S20 is a process of storing the record of the content data which is acquired in the Step S19 and stored in the content data cache area of the storage unit 12, in the stored content catalogue information. The "Retrieved result record storing process" and the "Acquired content data record storing record process" have commonality in storing a newly acquired record in the stored content catalogue information.

In an embodiment of the invention, first, at Step S31, the controller unit 11 may determine if a record of the acquired content data has been stored in the local catalogue information. When the controller unit 11 determines the record has been stored in the local catalogue information, e.g., "YES" at Step S31, then controller unit 11 finishes the "Retrieved result record storing process" or the "Acquired content data record storing record process." When the controller unit 11 determines the record has not been stored in the local catalogue information, e.g., "NO" at Step S31, then at Step S32, controller unit 11 may determines if a condition of storing determination is met.

The condition of storing determination, according to an embodiment of the invention, may be a maximum number of the records to be stored in the storing content catalogue information. When a new record is stored in the stored content catalogue information, the controller unit 11 may determine if the number of the records to be stored in the storing content catalogue information is more than the maximum number. In another embodiment of the invention, the condition of storing determination is a predetermined maximum data capacity of the storing content catalogue information. In this embodiment, when a new record is stored in the stored content catalogue information, the controller unit 11 determines if the data capacity for the records to be stored in the storing content catalogue information is more than the maximum data capacity. When the number of the records or the data capacity for the records to be stored in the stored content catalogue information is not more than the maximum number or the maximum data capacity, the controller unit 11 determines the condition of storing determination is met.

The controller unit 11 may determine the condition is met when a rule of storing a new acquired record in the stored content catalogue information is set in the content distribution storage system S. In this case, when the controller unit 11 determines an amount of data is more than an amount of spaces in the storage area of the stored content catalogue information, the controller unit 11 continues to delete a deleting process described below until the controller unit 11 generates a predetermined amount of spaces in the storage area of the stored content catalogue information. When controller unit 11 determines the condition is not met, e.g., "NO" at Step S32, then at Step S33, controller unit 11 may perform a record delete process of deleting the record which is stored in the stored content catalogue information. After the Step S33, the controller unit 11 may perform Step S34. In an embodiment of the invention, the record delete process is a process of deleting the record, which is selected as a delete record based on a predetermined condition, from the stored content catalogue information. In an embodiment of the invention, the predetermined condition is to delete a record which is stored in the stored content catalogue information at the oldest time from the stored content catalogue information. In another embodiment of the invention, the predetermined condition is to delete a record which is selected randomly. In yet another embodiment of the invention, the predetermined condition may be to delete a record which has lower-priority to be stored in the stored content catalogue information based on a fitness value of the record.

When the condition is the maximum number or the maximum data capacity, the controller unit 11 may continue to perform the record deleting process until the controller unit 11 determines the condition is met. When the controller unit 11 determines that the condition is met, e.g., "YES" at Step S32, then at Step S34, the controller unit 11 stores the record in the stored content catalogue information and finishes the "Retrieved result record storing process" and the "Acquired content data record storing process."

When the controller unit 11 performs the "Retrieved result record storing process" in the Step S16, i.e., when the controller unit 11 stores the record which is registered in the list of the retrieved result in the stored content catalogue information, the controller unit 11 may apply processes of Step S31 to Step S34 to all records which are registered in the list of the retrieved result.

3-3. "Message Receiving Process"

Figure 5:
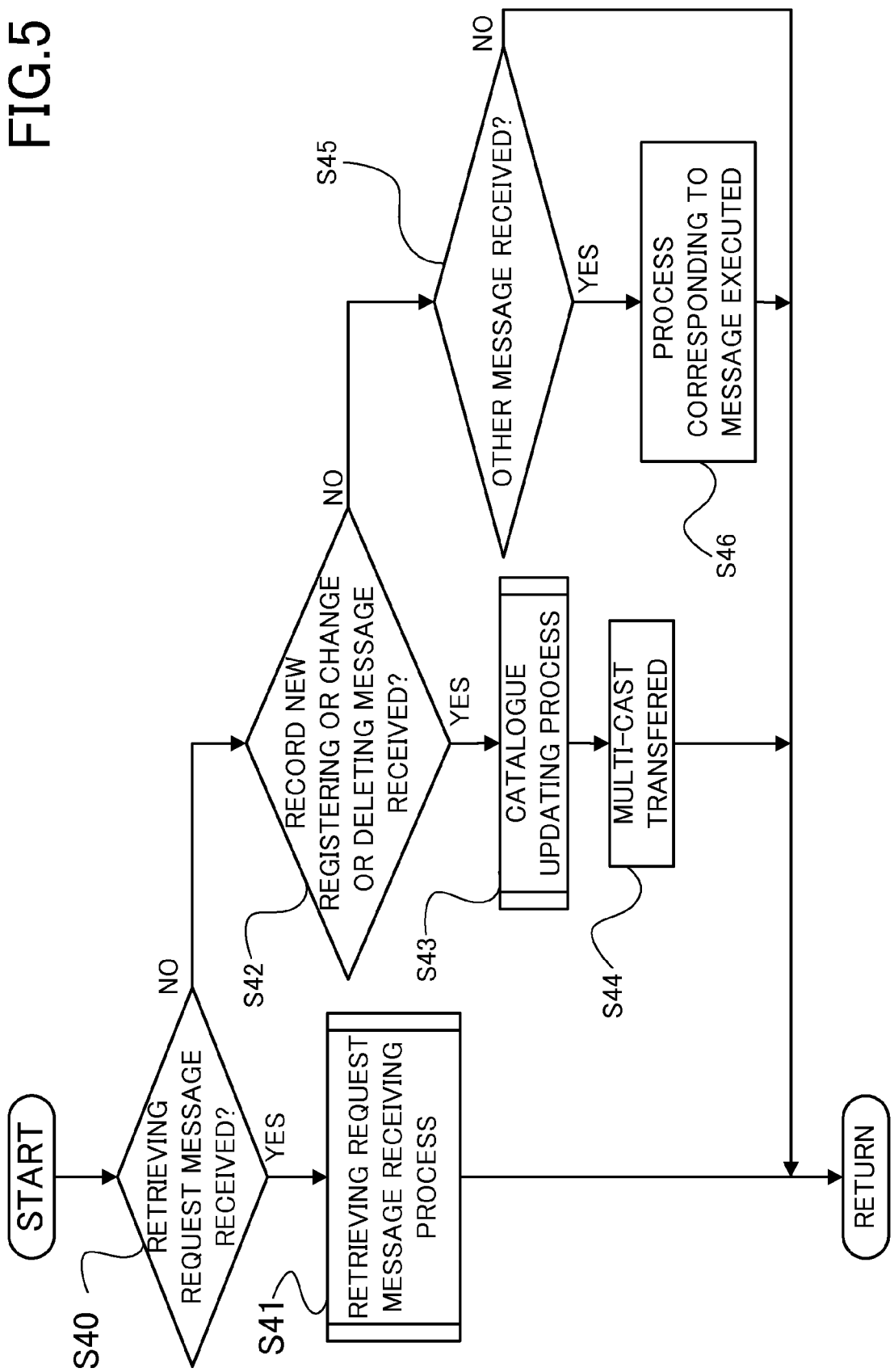
FIG. 5 shows a flow chart of "message receiving process".

FIG. 5 illustrates a process flow chart of "message receiving process."

First, the controller unit 11 determines if the controller unit 11 receives a retrieving request message from another node Nn (Step S40). When the controller unit 11 determines that the controller unit 11 receives the retrieving message (Step S40:Yes), the controller unit 11 performs a "retrieving request message receiving process" (Step S41) and finishes the "retrieving request message receiving process". In the "retrieving request message receiving process", the controller unit 11 retrieves an intended record in the local catalogue information and the stored content catalogue information of the storage unit 12. Concretely, the controller unit 11 determines if the storage unit 12 stores a record corresponding to a content ID which is included in the retrieving request message or not. When the controller unit 11 determines the storage unit 12 stores the record (Step S40:Yes), the controller unit 11 sends the retrieved record as a retrieved result to a node Nn which sends the retrieving request message. Detailed process of "retrieving request message receiving process", are described, for example, in US Patent Application Publication No. 2009/037445 A1, the entire contents of which are incorporated herein by reference.

When the controller unit 11 determines the storage unit 12 does not store the record (Step S40: No), the controller unit 11 determines if the controller unit 11 receives any of a newly registering message, a change message, and a deleting message of the record from another node Nn or the management server or not (Step S42). The newly registering message is sent by the management server in a multi-casted manner, when the management server throws a new content in the content distribution storage system S. The change message is sent by the management server in a multi-casted manner, when the management server changes the record which has been thrown in the content distribution storage system S. The deleting message is sent by the management server in a multi-casted manner, when the management server deletes the record which has been thrown in the content distribution storage system S. These messages as described above are sent to all nodes Nn which participate in the content distribution storage systems S by the management server in a multi-cast manner, based on a predetermined rule.

In some cases, the management server sends these messages to all nodes Nn in the content distribution storage system S. In other cases, the management server sends these messages to the node Nn which participates in content distribution storage system S based on a predetermined rule. Then the node Nn which receives these messages from the management server transfers the received messages to another node Nn using DHT routing table. As a result of transferring, these messages sent by management server are sent to all nodes Nn in a multi-cast manner. In this embodiment, the latter case is applied, namely, the management server sends the messages to the node Nn which participates in content distribution storage system S based on a predetermined rule.

As a result of determination in Step S42, when the controller unit 11 determines the node Nn receives any of the newly registering message, the change message, and the deleting message (Step S42: Yes), the controller unit 11 performs a "catalogue updating process" (Step S43). A detailed process of Step S43 is explained below.

After updating the content catalogue, the controller unit 11 transfers any of the newly registering message, the change message, and the deleting message in a multi-casted manner (Step S44).

Then, the controller unit 11 determines if the controller 11 receives any of the content retrieving message (query), the content registering message (publish), the content deleting message and the content storing request message from another node Nn or not (Step S45).

As a result of determination, the controller unit 11 finishes the "message receiving process" when the controller unit 11 determines the controller unit 11 does not receive any of the content retrieving message (query), the content registering message (publish), the content deleting message and the content storing request message (Step S45: No).

When the controller unit 11 determines the controller unit 11 receives any of the content sending request message, the content retrieving message (query), the content registering message (publish), the content deleting message and the content storing request message (Step S45: Yes), the controller unit 11 performs a process corresponding the received message (Step S46) and finishes the "message receiving process". When the controller unit 11 receives the content sending request message, the controller unit 11 sends content data corresponding to the content ID which is included in the content sending message in the storage unit 12. When the controller unit 11 receives the content retrieving message, the controller 11 determines if the storage unit 12 stores the index information of content holding node corresponding to content ID which included in the content retrieving message or not. When the storage unit 12 stores the index information, the controller unit 11 sends the index information which includes the address information of content holding node to a node Nn which sends the content retrieving message.

When the controller unit 11 receives the content storing request message from the management server, the controller unit 11 acquires the content data corresponding to the content ID which is included in the content storing message and stores the acquired content data in the cache area. As described above, according to the received message, the controller unit 11 performs a function of any of the transferring node, the root node, and the content holding node. When the controller unit 11 stores the content data in the content data cache area of the storage unit 12 based on the content storing request message which is sent from the management server, the controller unit 11 performs the "acquired content data record storing process". Then the controller unit 11 acquires the record of the content data which is stored in the cache area of the storage unit 12 and stores the record in the stored content catalogue information.

When the controller unit 11 acquires the content data corresponding to the content ID which is included in the content sending request message from the content data cache area of the storage unit 12 and sends the acquired content data, the controller unit 11 checks if a time limit for publishing the content data through Internet, has passed in reference to the stored content catalogue information and the local catalogue information in the storage unit 12. Then, the controller unit 11 sends a content data the time limit of which has not passed. If there is no record of the content data which is sent in the stored content catalogue information and the local catalogue information of the storage unit 12, the controller unit 11 performs the "catalogue retrieving process" and checks the time limit based on the acquired record from another node Nn. The process prevents from sending a content data the time limit of which has passed.

When the controller unit 11 checks the time limit, the controller unit 11 stores time of checking the time limit corresponding to the content ID in a check list of the storage unit 12 as last check time. When the controller unit 11 stores the last check time, if the last check time has been stored in the check list of storage unit 12, the controller unit 11 updates the last check time.

Detailed process of various types of the received messages in step S35, are described, for example, in US Patent Application Publication No. 2009/037445 A1, the entire contents of which are incorporated herein by reference.

3-4. "Storing Content Data Check Process"

Figure 6:
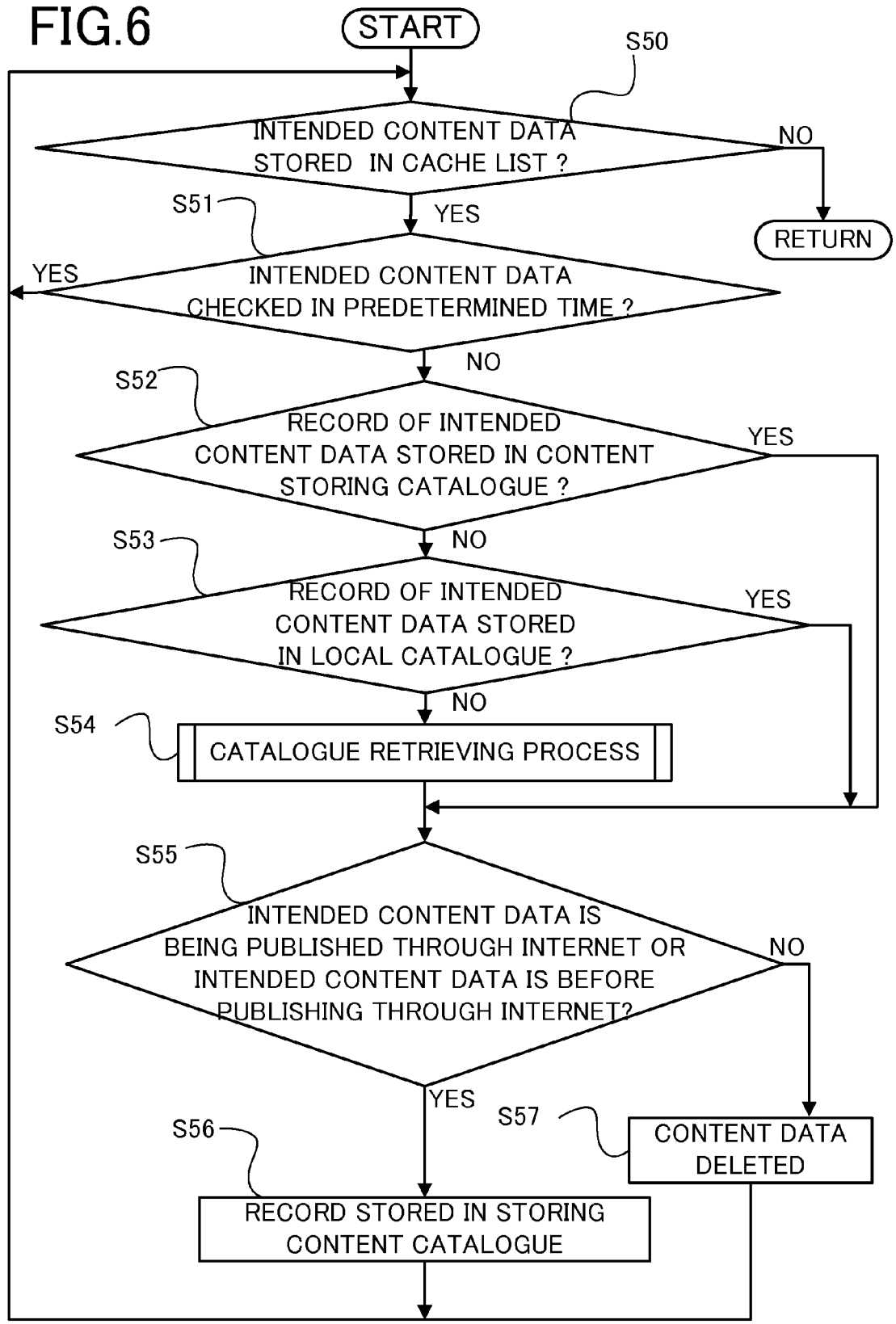
FIG. 6 shows a flow chart of "stored content data checking process" in step S23.

FIG. 6 illustrates a process flow chart of "stored content data check process" in step S23. First, at Step S50, the controller unit 11 determines if the storage unit 12 stores an intended content to be checked in a cache list of storage unit 12. When the controller unit 11 determines the storage unit 12 does not stores the intended content, e.g., "NO" at Step S50, the controller unit 11 finishes the "storing content data checking process." In an embodiment of the invention, when there is a "NO" at Step S50, there is no content in the cache area of the storage unit 12, or the controller unit 11 performs the "stored content data check process" and has completed checking all contents in the cache list. When the controller unit 11 determines that the storage unit 12 stores the intended content, e.g. "YES" at Step S50, then at Step S51, controller unit 11 determines if the controller unit 11 checks the intended content data within a predetermined time frame. When the controller unit 11 determines the controller unit 11 does not check the intended content data within a predetermined time frame, e.g., "NO" at Step S51, then at Step S52, controller unit 11 determines if a record of the intended content data is stored in the stored content catalogue information. When the controller unit 11 determines the record of the intended content data is stored in the stored content catalogue information, e.g. "YES" at Step S52, the controller unit 11 performs Step S55. When the controller unit 11 determines the record of the intended content data is not stored in the stored content catalogue information, e.g. "NO" at Step S52, then at Step S53, controller unit 11 determines if a record of the intended content data is stored in the local catalogue information. When the controller unit 11 determines the record of the intended content data is stored in the local catalogue information, e.g., "YES" at Step S53, the controller unit 11 performs Step S55. When the controller unit 11 determines the record of the intended content data is not stored in the local catalogue information, e.g., "NO" at Step S53, the controller unit 11 performs the "catalogue retrieving process" at Step S54. In the "catalogue retrieving process" performed at Step S54, the controller unit 11 sends the retrieving request message indicative of the intended content data to another node Nn. Another node Nn retrieves a record of the intended content data in the storing content catalogue information and the local catalogue information in the storage unit 12 of another node Nn. Then another node Nn sends a record of the intended content data as the retrieved result.

The retrieving request message in Step S54 may comprise the content ID or the name of content data. The controller unit 11 sends the retrieving request message as described above. In the "catalogue retrieving process" in Step S54, the controller unit 11 may not retrieve the record in the local catalogue information. A detailed process of the "catalogue retrieving process" is described, for example, in US Patent Application Publication No. 2009/037445 A1.

Then, the controller unit 11 acquires the record of the intended content data from the local catalogue information or the stored content catalogue information, or from another node Nn by the "content retrieving process." At Step S55, the controller unit 11 determines if the intended content data is being published through Internet or the intended content data is before publishing through Internet, based on the publication period information or not. When the controller unit 11 determines the intended content data is being published through Internet or the intended content data is before publishing through Internet, e.g. "YES" at Step S55, then at Step S56, controller unit 11 stores the last check time in the cache list of the storage unit 12. If the last check time has been stored in the cache list, the controller unit 11 updates the latest last check time. When the controller unit 11 determines the intended content data is not being published through Internet, or when the controller unit 11 determines the intended content data is to be published through Internet at a later time, e.g., "NO" at Step S55, then at Step S57, the controller unit 11 deletes the intended content data from the content cache area of the storage unit 12. In the step S57, when a record of the deleted content data is stored in the local catalogue information or the stored content catalogue information, the controller unit 11 deletes the record from the local catalogue information or the stored content catalogue information.

When the controller unit 11 determines the controller unit 11 checks the intended content data within a predetermined time frame, e.g., "YES" at Step S51, then the controller unit 11 performs Step S50. In other case, e.g., "NO" at Step S51, after performing the Step S56 or the Step S57, the controller unit 11 performs the step S50. The controller unit 11 continues to perform the process from Step S50 to Step S57, until there is no more intended content in the cache area of the storage unit 12, e.g., the controller unit 11 has completed checking all contents in the cache list. The predetermined time in Step S51 may be determined by each node Nn or the management server. When the predetermined time in the step S51 is shorter, the node Nn checks or confirms the publication period of content more strictly. Nevertheless, when the predetermined time in Step S51 is shorter, the burden of processing of checking or confirming by the node Nn is increased.

Moreover, the node Nn checks or confirms the publication period of content. When the node Nn performs "Catalogue retrieving process" in Step S54, a network burden in the content distribution storage system S that each node Nn communicates with another node Nn through Internet may increase. Then, the predetermined time in Step S51 may be determined by each node Nn or the management server in consideration of performance of each node Nn or the number of content in the cache list or the number of nodes Nn which participate in the content distribution storage system S.

3-5. "Catalogue Updating Process"

Figure 7:
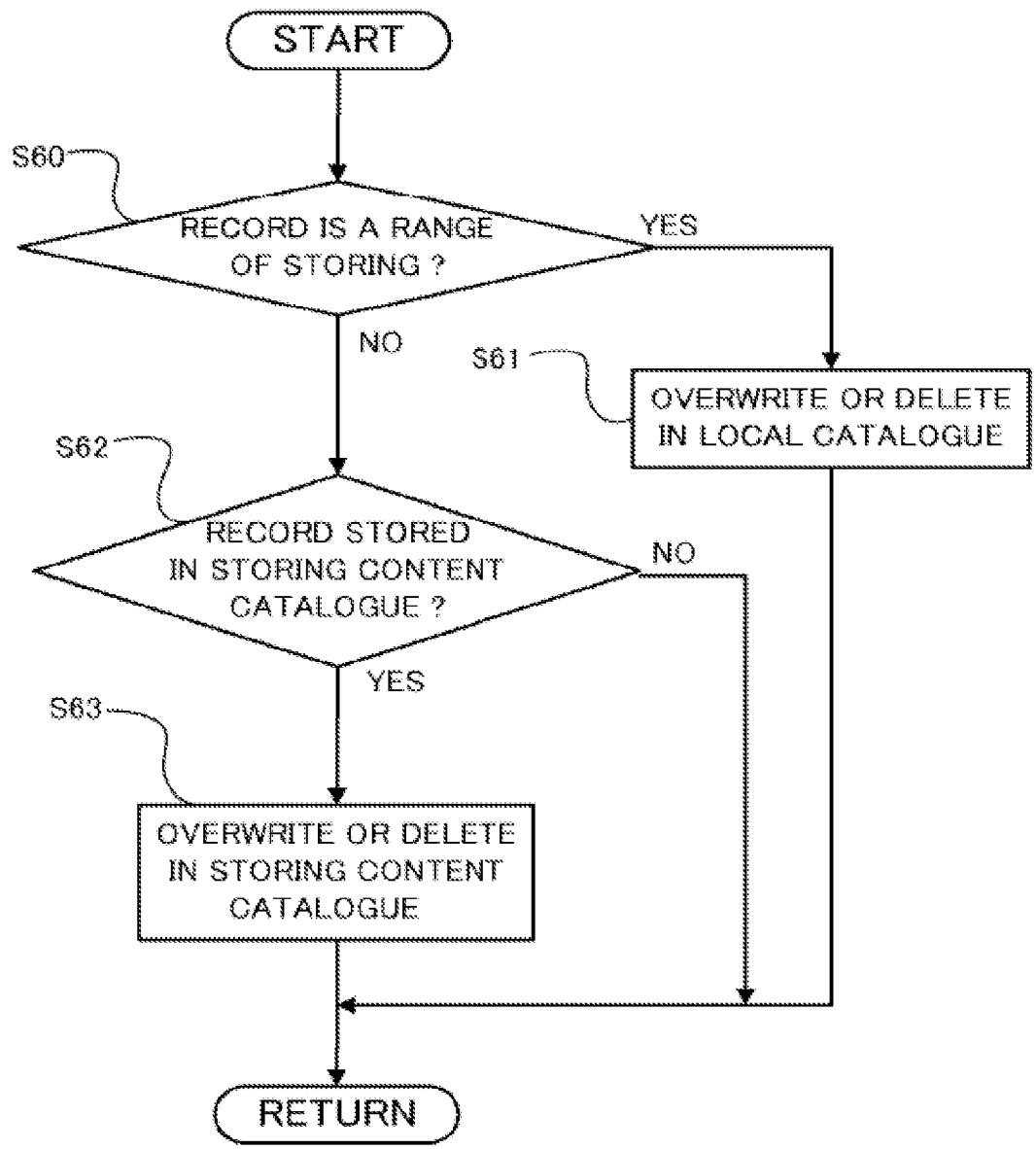
FIG. 7 shows a flow chart of "catalogue updating process" in step S43.

FIG. 7 shows a flow chart of "catalogue updating process" in step S43.

First, at Step S60, the controller unit 11 determines if the record included in the received message in Step S42 should be stored as a range of storing in the internal memory or not, based on the "Range." Specifically, the controller unit 11 may determine whether the acquired record should be stored in the internal memory, based on its own "Range" and the node ID.

For example, in an embodiment of the invention, when the "Range" is equal to 1 and the node ID is "0100", the controller unit 11 may determine that the record of the content ID having at least the highest digit of "0" is stored in its internal memory as the range of storing. When the controller unit 11 determines that the record included in the received message in the step S42 should be stored as the range of storing, e.g., "YES" at Step S60, the controller unit 11 stores or overwrites the acquired record in the Step S42 in the local catalogue information, or deletes the acquired record in Step S42 from the local catalogue information, and after storing or overwriting or deleting, the controller unit 11 finishes the catalogue update process.

In Step S61, if the received message in Step S42 is the newly registering message, the newly registering message includes the newly registering record and the controller unit 11 stores the newly registering record in the local catalogue information. In Step S61, if the received message in Step S42 is the change message, the change message includes the change record and the controller unit 11 overwrites the change record in the local catalogue information. In Step S61, if the received message in Step S42 is the deleting message, the deleting message includes the deleting record and the controller unit 11 deletes the deleting record from the local catalogue information.

When the controller unit 11 determines that the record included in the received message in Step S42 should not be stored as the range of storing, e.g., "NO" at Step S60, then at Step S62, controller unit 11 may determine if the record included in the received message in the step S42 is stored in the stored content catalogue information.

When the controller unit 11 determines that the record included in the received message in the step S42 is stored in the stored content catalogue information, e.g. "YES" at Step S62, then at Step S63, controller unit 11 overwrites or deletes the record in the stored content catalogue information, based on the record included in the received message in Step S42, and finishes "catalogue updating process."

As explained above, in this embodiment, the node Nn stores a record corresponding to a stored content data in the stored content catalogue information. Then, this embodiment decreases a network burden in order to manage the content data stored in the content data cache area of storage unit 12 in reference to the stored content catalogue information or the local catalogue information in the storage unit 12.

As explained in the step S42 and step S43, the controller unit 11 receives the record which is sent by the management server in a multi-cast manner and stores the received record in the local catalogue information or the stored content catalogue information. Then if the received record is stored in its internal memory as the range of storing, the controller unit 11 can store or update the received record in the local catalogue information. And if the received record has been stored in the stored content catalogue information, the controller unit 11 can also update the stored content catalogue information using the received record.

As explained in the Step S52 and the Step S53, in this embodiment, the controller unit 11 refers to the stored content catalogue information before referring to the local catalogue information, when the controller unit 11 manages the content data which is stored in the content data cache area of the storage unit 12. Then, the controller unit 11 can retrieve in the stored content catalogue information which stores records of a predetermined range of storing before retrieving in the local catalogue information which stores the record corresponding to the content data which is stored in content data cache area of the storage unit 12.

As explained in the Step S11, Step S14 and Step S16, in this embodiment, the controller unit 11 sends the retrieving request message to another node Nn in the "catalogue retrieving process", when the controller unit 11 receives the retrieving request and stores the record as a retrieving result in the stored content catalogue information. Then, the controller unit 11 can stores a record which has been retrieved in the past in the stored content catalogue information. When the controller unit 11 receives the retrieving request in the Step S11, the controller unit 11, first, can retrieve in the stored content catalogue information in the Step S13. Then, in this embodiment, the controller unit 11 can retrieves in the stored content catalogue information which includes the record which has been retrieved in the past before retrieving the local catalogue information.

In this embodiment, the record of retrieved result is stored in the stored content catalogue information. Another embodiment may utilize a retrieved result catalogue In this embodiment, the controller unit 11 retrieves the record in the stored content catalogue information before retrieving in the local catalogue information, when the controller unit 11 retrieves in the step S11. In another embodiment, the controller unit 11 may retrieve in the local catalogue information before retrieving in the storing content catalogue information.

The controller unit 11 may compare an amount of data capacity of the stored content catalogue with that of the local catalogue information, when the controller unit 11 retrieves the record in the Step S11. Then, based on a result of comparison, the controller unit 11 may retrieve in the larger amount of data capacity before retrieving in the smaller amount of data capacity. The controller unit 11 may compare an amount of data capacity of the stored content catalogue information with that of the local catalogue information, when the controller unit 11 retrieves the record included in the retrieving request message which is received from another node Nn in the Step S41. Then, based on a result of comparison, the controller unit 11 may retrieve in the larger amount of data capacity before retrieving in the smaller amount of data capacity.

In this embodiment described in the Step S52 or Step S53, the controller unit 11 refers to the corresponding content catalogue information prior to the local catalogue information, when the controller unit 11 manages the stored content data in content data cache area of the storage unit 12 and retrieves the record of the stored content data. Generally, retrieving from the corresponding content catalogue information has a greater likelihood of retrieving the intended record rapidly than retrieving from the local catalogue information because the local catalogue information has only the records of the range of storing.

In this embodiment, the controller unit 11 deletes the record corresponding to the deleted content data from the local catalogue information and the corresponding content catalogue information, when the controller unit 11 deletes content data in the Step S57. An unnecessary record is deleted from the local catalogue information and the corresponding content catalogue information rapidly. Moreover, in this embodiment, the controller unit 11 performs a record delete process of deleting the record which is stored in the stored content catalogue information in the Step S33. The controller 11 can obtain a storage area in the storage unit 12 by deleting the record in the Step S33 and stores a new record in the obtained storage area.

The content distribution storage system S of this embodiment uses the DHT routing table. However, the present invention is not limited to this embodiment The content distribution storage system S may use other routing table which includes the node information. In this embodiment, the content distribution storage system S is applied to a P2P (peer-to-peer) system of so-called pure type utilizing DHT. This invention may also be applied to another P2P system. For example, in a P2P system of so-called hybrid type, such as a Napster, contents are stored in respective node devices in a distributed manner; however, locations of the contents are managed by a server.

What is claimed is:

1. A node device configured to communicate with a plurality of other node devices via a network as part of an information communication system, the node device comprising:
a memory configured to store first content data, first catalogue information that includes a first predetermined value that identifies the node for storing the first content data in the memory, and second catalogue information that includes a second predetermined value that identifies one or more of the plurality of other node devices for storing second content data; and
a processor configured to execute computer-readable instructions to cause the node device to:
receive catalogue information comprising at least one of the first catalogue information and the second catalogue information;
apply a predetermined rule to determine whether the catalogue information received by the node device includes the first predetermined value or the second predetermined value;
store the catalogue information received by the node device in the memory when the catalogue information received by the node device currently is not stored in the memory;
retrieve first content data from the information communication system when the first content data currently is not stored in the memory and the catalogue information received by the node device that corresponds to the first content data includes the first predetermined value;

store the first content data retrieved by the node device in the memory when the first content data retrieved by the node device currently is not stored in the memory;

retrieve the first content data stored in the memory of the node device when the catalogue information received by the node device is first catalogue information and the first content data that corresponds to that first catalogue information is stored in the memory; and retrieve the second content data stored in the one or more of the plurality of other node devices when the catalogue information received by the node device is second catalogue information.

2. The node device according to claim 1, wherein the processor is configured to retrieve the first content data from an information processing device which is included in the information communication system when the catalogue information received by the node device is first catalogue information and the first content data that corresponds to that first catalogue information currently is not stored in the memory.

3. The node device according to claim 1, wherein the processor is configured to store second catalogue information in the memory when the catalogue information received by the node device is second catalogue information and currently is not stored in the memory.

4. The node device according to claim 1, wherein the processor is configured to:

retrieve first catalogue information that corresponds to the first content data that the processor retrieves; and store the first catalogue information that the processor retrieves on the memory.

5. The node device according to claim 1, wherein the node further comprises an input device configured to receive the catalogue information.

6. The node device according to claim 1, wherein:

the first and second catalogue information comprises publication time information that indicates a period during which the first and second content data is to be published in the network, the processor is configured to refer to the publication time information from the first catalogue information stored in the memory prior to referring to the publication time information from the second catalogue information stored in the memory, and the processor is configured to delete the first content data from the memory when the publication time information corresponds to a time that has passed.

7. The node device according to claim 1, wherein the processor is configured to:

delete the first content data in the memory based on a predetermined condition; and delete the first catalogue information from the memory that corresponds to the first content data deleted from the memory.

8. The node device according to claim 1, wherein the processor is configured to:

determine whether the memory has a sufficient storage area to store the first or second catalogue information; and delete at least a portion of the first and second catalogue information stored in the memory when the processor determines that the memory does not have the sufficient storage area.

9. The node device according to claim 1, wherein the processor is configured to store identification information, the identification information comprising information that identifies one node device from among the node device and the plurality of other node devices on which the identification information is stored, wherein, the predetermined rule applied by the processor to determine whether the catalogue information received by the node device is first catalogue information or second catalogue information is based on a comparison result between the identification information and the catalogue information received by the node device.

10. The node device according to claim 9, wherein the identification information comprises at least one number;

the catalogue information received by the node comprises at least one number; and the predetermined rule applied by the processor to determine whether the catalogue information received by the node device is first catalogue information or second catalogue information is also based on a comparison result of whether the at least one number of the identification information corresponds to the at least one number of the catalogue information received by the node device.

11. The node device according to claim 10, wherein the predetermined rule applied by the processor to determine whether the catalogue information received by the node device is first catalogue information or second catalogue information is based on a comparison result of whether a high rank digit of the at least one number of the identification information corresponds with a high rank digit of the at least one number of the catalogue information received by the node device.

12. The node device according to claim 1, wherein:

the first and second catalogue information comprises status information that indicates a period during which the first and second content data is to be accessible to the node device and the plurality of other node devices; and the processor is configured to check the publication time information of the first catalogue information and the second catalogue information stored in the memory to determine whether the publication time has passed.

13. The node device according to claim 12, wherein the processor is configured to store the first catalogue information in the memory of the node device when the publication time information for the first catalogue information corresponds to a time that has not passed.

14. A method for managing content data in an information communication system in which a plurality of node devices are connected via a network and communicate with each other, the content data being stored in a memory of at least one node device and being accessible from other node devices, the method comprising:

executing computer readable instructions with a processor to receive catalogue information comprising at least one of first catalogue information that includes a first predetermined value that identifies the at least one node device for storing the first content data in the memory and second catalogue information that includes a second predetermined value that identifies one or more of the other node devices for storing second content data;

executing computer readable instructions with the processor to apply a predetermined rule to determine whether the received catalogue information includes the first predetermined value or the second predetermined value;

executing computer readable instructions with the processor to store the received catalogue information in the memory of the at least one node device when the received the catalogue information currently is not stored in the memory;

executing computer readable instructions with the processor to retrieve first content data from the information communication system when the catalogue information received by the node device is first catalogue information and the first content data that corresponds to that first catalogue information is stored in the memory;

executing computer readable instructions with the processor to store the retrieved content data in the memory when the retrieved first content data currently is not stored in the memory;

executing computer readable instructions with the processor to retrieve the first content data stored in the memory of the at least one node device when the catalogue information received by the node device is first catalogue information and the first content data that corresponds to that first catalogue information is stored in the memory;

executing computer readable instructions with the processor to retrieve second content data stored in the other of the plurality of node devices when the received catalogue information is second catalogue information.

15. A computer program product comprising a non-transitory computer readable medium having computer readable instructions stored thereon, the computer readable instructions configured to be executed by a processor in at least one node device of a plurality of node devices connected via a network in an information communication system in which content data is stored in the at least one node device and is accessible from the other of the plurality of node devices, the computer program causing the computer to:

receive catalogue information comprising at least one of first catalogue information that includes a first predetermined value that identifies the at least one node device for storing the first content data in the memory and second catalogue information that includes a second predetermined value that identifies one or more of the other of the plurality of node devices for storing second content data;

apply a predetermined rule to determine whether the received catalogue information includes the first predetermined value or the second predetermined value;

store the received catalogue information in the memory when the received catalogue information currently is not stored in the memory;

retrieve first content data from the information communication system when the first content data currently is not stored in the memory and the catalogue information received by the node device that corresponds to the first content data includes the first predetermined value;

store the retrieved first content data in the memory of the node device when the retrieved first content data currently is not stored in the memory;

retrieve the first content data stored in the memory when the catalogue information received by the node device is first catalogue information and the first content data that corresponds to that first catalogue information is stored in the memory;

retrieve second content data stored in the other of the plurality of node devices when the received catalogue information is second catalogue information.

16. An information communication system comprising:
a first device comprising:
a first memory configured to store first content data, first catalogue information, and second catalogue information, the first catalogue information identifies the first content data for storage in first memory, wherein the first catalogue information includes a first predetermined value that identifies the first device for storing the first content data in the first memory;

a first processor configured to execute first computer-readable instructions to cause the first device to perform as a first node in the communication system;

a second device comprising:
a second memory configured to store second content data, the first catalogue information, and the second catalogue information, wherein the second catalogue information includes a second predetermined value that identifies the second device for storing the second content data in the second memory;

a second processor configured to execute second computer-readable instructions to cause the second device to perform as a server or a second node in the communication system, wherein the first processor executes the first computer-readable instructions to:

receive catalogue information comprising at least one of the first catalogue information and the second catalogue information;

apply a predetermined rule to determine whether the catalogue information received by the first device includes at least one of the first predetermined value and the second predetermined value;

store the catalogue information received by the first device in the first memory when the catalogue information received by the first device currently is not stored in the first memory;

retrieve first content data from the information communication system when the first content data currently is not stored in the memory and the catalogue information received by the node device that corresponds to the first content data includes the first predetermined value;

store the content data retrieved by the first device in the first memory when the first content data retrieved by the first device currently is not stored in the first memory;

retrieve the first content data stored in the first memory when the catalogue information received by the node device is first catalogue information and the first content data that corresponds to that first catalogue information is stored in the memory; and retrieve the second content data stored in the second memory when the catalogue information received by the first device is second catalogue information.

17. The information communication system according to claim 16, wherein:

the second processor is configured to execute second computer-readable instructions to cause the second device to perform as a server in the communication system; and the information communication system further comprises at least one third device comprising:
a third memory configured to store the second content data, the first catalogue information, the second catalogue information, and the third catalogue information;

a third processor configured to execute third computer-readable instructions to cause the third device to perform as at least a second node in the communication system.

18. The information communication system according to claim 17, wherein the second processor executes the second computer-readable instructions to transmit the first catalogue information and the second catalogue information to the first device and the third device.

* * * * *